United States Patent [19]
Yoneda

[11] Patent Number: 5,968,375
[45] Date of Patent: Oct. 19, 1999

[54] METHOD FOR WELDING AND APPARATUS THEREFOR

[75] Inventor: Eiji Yoneda, Naka-gun, Japan

[73] Assignee: Mitsubishi Nuclear Fuel Co., Tokyo, Japan

[21] Appl. No.: 08/990,763

[22] Filed: Dec. 15, 1997

[30] Foreign Application Priority Data

Dec. 27, 1996 [JP] Japan .................................... 8-351336

[51] Int. Cl.⁶ ................................................ B23K 9/167
[52] U.S. Cl. ........................................ 219/75; 219/137 R
[58] Field of Search ............................. 219/137 R, 122, 219/136, 137.42, 137 WM, 74, 75

[56] References Cited

U.S. PATENT DOCUMENTS

| | | | |
|---|---|---|---|
| 2,862,294 | 12/1958 | Philip | 219/137 R |
| 3,548,143 | 12/1970 | Reeh | 219/74 |
| 3,838,243 | 9/1974 | Inagaki et al. | 219/122 |
| 4,090,057 | 5/1978 | Okada | 219/122 |
| 4,296,300 | 10/1981 | Bottiglia | 219/137 R |
| 5,440,099 | 8/1995 | Smith | 219/137 R |
| 5,811,756 | 9/1998 | Horita et al. | 219/137 WM |

FOREIGN PATENT DOCUMENTS 1342646  10/1987  U.S.S.R. .................................. 219/74

*Primary Examiner*—Clifford C. Shaw
*Attorney, Agent, or Firm*—Oblon, Spivak, McClelland, Maier & Neustadt, P.C.

[57] ABSTRACT

The present invention relates to a method for welding comprising the steps of: contacting a plurality of workpieces to be welded having different heat capacities so as to form a boundary portion therebetween; placing a welding electrode in proximity to the boundary portion; generating an arc discharge between the welding electrode and the boundary portion; and supplying gas to the boundary portion, wherein more gas being supplied to one of the workpieces having a lower heat capacity than another workpiece having a higher heat capacity.

7 Claims, 5 Drawing Sheets

PRIOR ART

METHOD FOR WELDING AND APPARATUS THEREFOR

BACKGROUND OF THE INVENTION

The present invention relates to a method and an apparatus for welding workpieces having different heat capacities, for example, a cladding tube and a plug of a fuel rod used in a nuclear reactor, in tungsten inert gas (TIG) welding process.

Referring to FIG. 10 showing a fuel rod, fuel pellets 2 are inserted into a cladding tube 1 made of zircaloy. A spring 4 is also inserted in a plenum 3 inside the cladding tube 1. The plugs 5 and 6 are welded at both ends of the cladding tube 1, so that the fuel pellets 2 are urged to the plug 5.

The plugs 5 and 6 are welded to the cladding tube 1 of the fuel rod in a TIG welding process, which is carried out with a welding apparatus A as shown in FIG. 11.

In the TIG welding process, the plugs 5 and 6 are fitted into the both ends of the cladding tube 4 which includes the fuel pellets 2 and the spring 4. The cladding tube 4 is passed through a rotation holding means 7, and one end of the cladding tube 4 is further inserted through a hole 9 into a welding chamber 8 until the plug 5 or 6 comes into contact with a hollow 11 of a stopper 10, which is rotatably mounted to the opposing wall of the welding chamber 8.

The portion (surface) S where the cladding tube 1 and the plug 5 (or 6) mutually contact is welded with a welding apparatus 12 inserted from the upper side of the welding chamber 8, while the cladding tube 1 is being rotated by the rotation holding means 7.

Referring to FIG. 12, the welding apparatus 12 includes a welding electrode 14 disposed at the center of an opening of a gas nozzle 13. In use, the tip of the welding electrode 14 and the center of the gas nozzle 13 are placed adjacent to the contact portion (boundary portion) S. A current is passed between the welding electrode 14 and the contact portion S to form an arc discharge, which melts and welds the contact portion S. During the process, shield gas (inert gas) is introduced from the gas nozzle 13 and flows as illustrated with arrows in FIG. 11, preventing oxidation of the contact portion S.

In welding as described above, however, the cladding tube 1 which is one of the workpieces at the contact portion S, is cylindrical and hollow, while the plugs 5 and 6 are solid. The plugs 5 and 6 have therefore greater heat capacities, and there is a difference in temperature between the workpieces. The melting quantities differ between the cladding tube 1 and the plugs 5 and 6 at the contact portion S, and this leads to shift of the welding bead to the side of the cladding tube 1. The welding result is therefore unsatisfactory.

To avoid this, the arc is directed, in general, particularly toward the workpiece with the higher heat capacity. However, the arc spreads to the side of the workpiece with the lower heat capacity which is apt to be heated, resulting in inferior quality. Also, there is a problem in that an undercut U, as shown in FIG. 12, may occur on the cladding tube 1 with the low heat capacity.

SUMMARY OF THE INVENTION

It is an object of the present invention to provide a method and an apparatus for welding which achieves a satisfactory and easy welding process for workpieces having different heat capacities by providing a uniformly melted pool.

In order to accomplish the above object, a method for welding comprising the steps of:

contacting a plurality of workpieces to be welded having different heat capacities so as to form a boundary portion therebetween;

placing a welding electrode in proximity to the boundary portion;

generating an arc discharge between the welding electrode and the boundary portion; and supplying gas to the boundary portion, wherein more gas being supplied to one of the workpieces having a lower heat capacity than another workpiece having a higher heat capacity.

According to the present invention, the amount of flow of the gas is greater on the workpiece with a lower heat capacity than the workpiece with the higher heat capacity; that is, the shield gas is directed to one side of the welding electrode. This increases the heat input into the workpiece with the higher heat capacity, evenly melting the workpieces at the boundary portion to provide a uniformly melted pool, and forms a welding bead at the boundary portion so that the resulting workpieces have a even surface and sufficient strength. Thus, the welding result is satisfactory when workpieces with different heat capacities are welded.

In another aspect of the present invention, the tip of the welding electrode may be disposed off-center of the opening of the gas nozzle, for example, by bending the circumference of the opening, mounting a baffle to the opening, or bending the welding electrode. The tip of the welding electrode may be disposed at the boundary portion or toward the side of the workpiece with the higher heat capacity, so long as more gas is supplied to the workpiece with the lower heat capacity. A second gas nozzle may also be used in order to direct the arc discharge. In the welding process, tubular workpieces to be welded are preferably being rotated.

A welding apparatus according to the present invention comprising:

a welding electrode for generating an arc discharge between the welding electrode and a workpiece; and a gas nozzle for discharging gas around the welding electrode;

wherein the gas nozzle surrounds the welding electrode, and an opening of the gas nozzle being disposed off-center with respect to a tip of the welding electrode.

Besides the effect described above, the welding apparatus is constructed simply, reduces costs and improves welding quality and yield rate. Furthermore, contraction of a portion having high thermal expansion can be avoided.

DETAILED DESCRIPTION OF THE PREFERRED EMBODIMENTS

Referring to FIGS. 1 to 4, the best mode of the welding apparatus, according to the first embodiment of the present invention, will be explained.

As shown in FIGS. 1 to 4, a welding apparatus 20 includes a gas nozzle 21 for introducing shield gas (inert gas) such as argon gas or helium gas, the gas nozzle 21 being mounted to a collet body 22. A linear welding electrode 23 is also secured to the collet body 22 at the center of the gas nozzle 21.

Figure 1:
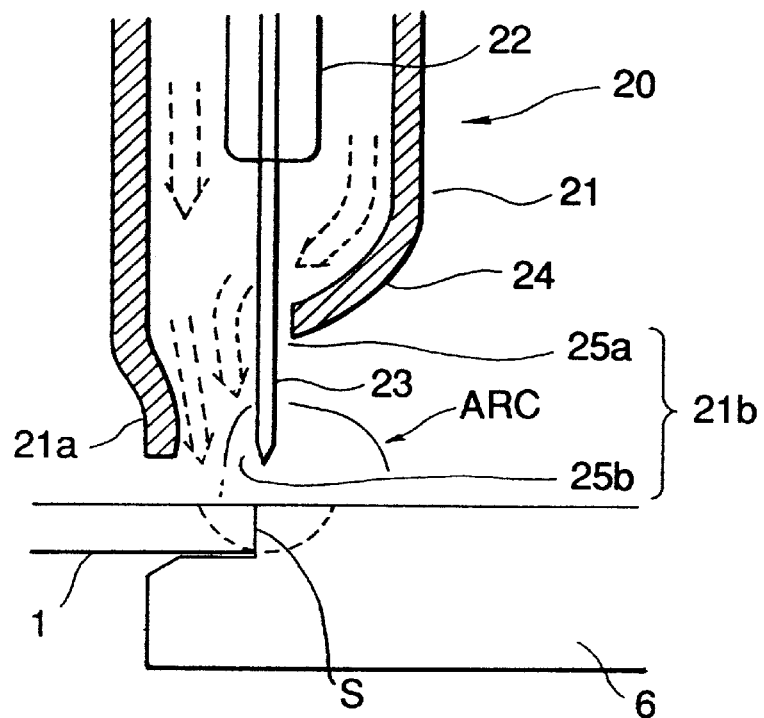
FIG. 1 is a detailed cross section of a welding apparatus in a process of a first embodiment according to the present invention.

The gas nozzle 21 is formed so as to be hollow and tapers off to a tip 21a having an opening 21b. The tip 21a is partially bent toward the welding electrode 23, forming a bent portion 24. According to FIG. 1, showing a vertical cross section, the bent portion 24 is formed so that there is a gap 25a between the welding electrode 23 and the bent portion 24. The gap 25a is narrower than a gap 25b in another side between the welding electrode 23 and tip 21a.

Figure 2:
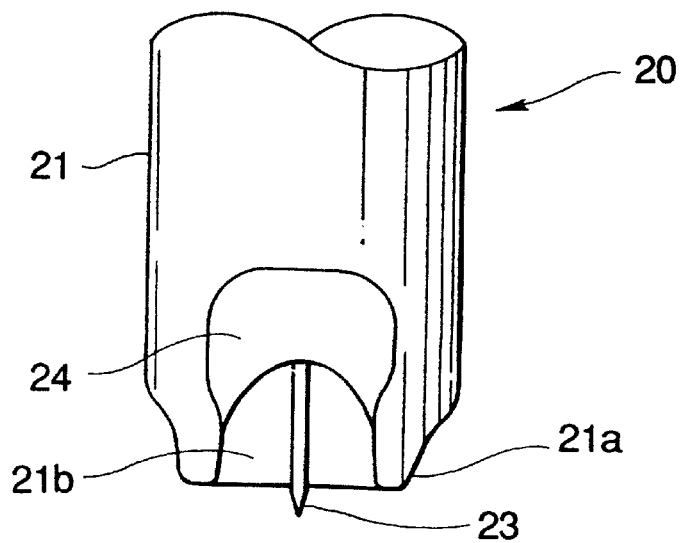
FIG. 2 is a side view as seen in the direction of a bent portion of the welding apparatus of the first embodiment.
Figure 3:
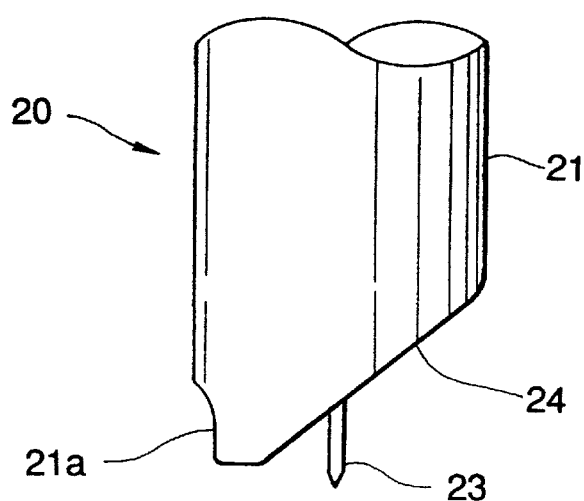
FIG. 3 is another side view as seen from the direction 90° with respect to the direction in FIG. 2.
Figure 4:
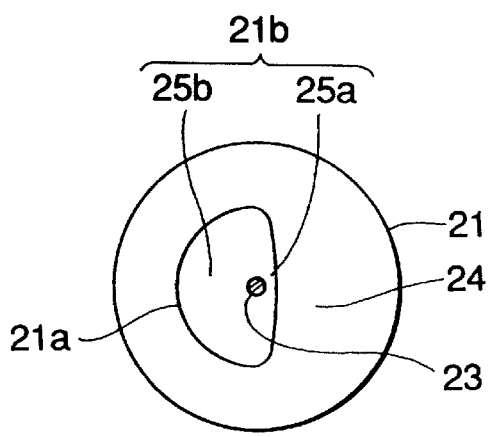
FIG. 4 is a bottom view of the tip of the welding apparatus of the first embodiment.

FIG. 2 shows the side view of the bent portion 24, which forms the opening 21b so that the lower end of the bent portion 24 is arranged above the tip 21a. In FIG. 3, showing another side view, the one side of the tip 21a is inclined. In FIG. 4 showing the tip opening 21b, the welding electrode 23 is disposed at the center of the gas nozzle 21, whereas the opening 21b of the gas nozzle 21 is disposed toward the sidewall opposing the bent portion 24. That is, the tip of the welding electrode 23 is disposed off-center of the opening 21a of the gas nozzle 21.

Next, a method for tungsten inert gas (TIG) welding, with the welding apparatus 20 formed as in FIG. 1, will be explained.

For example, in the process for welding a portion S where the cladding tube 1 with the low heat capacity and the plug 6 (or 5) with the high heat capacity mutually contact, the welding electrode 23 of the welding apparatus 20 is placed in proximity to the contact portion (boundary portion) S. The bent portion 24 of the tip 21a must be directed to the side of the plug 6 so as to dispose the narrow gap 25a of the opening 21b in the side of the plug 6 and the wide gap 25b in the side of the cladding tube 1.

Figure 11:
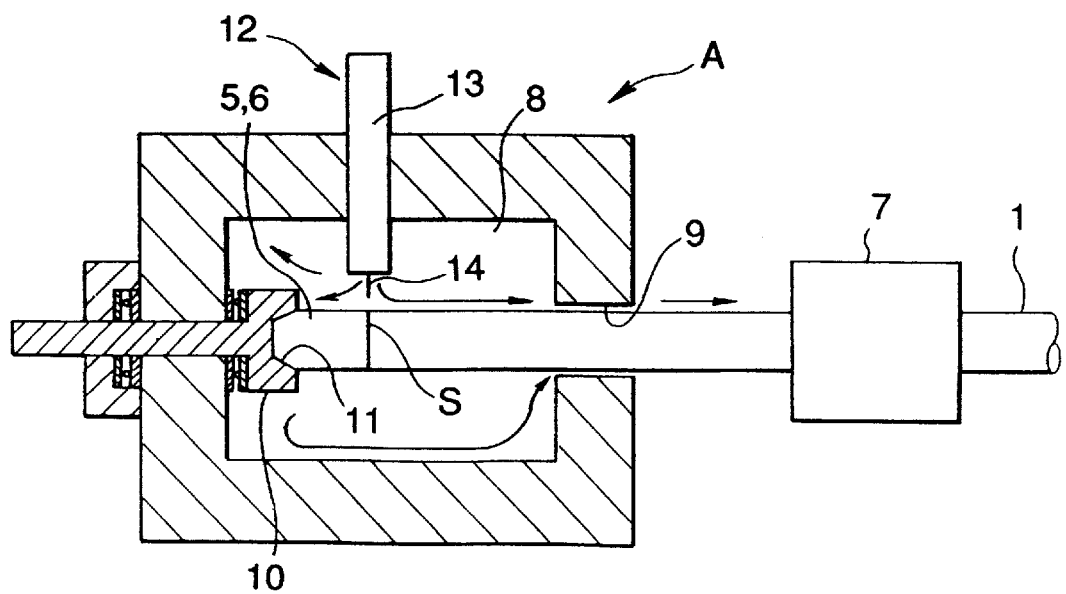
FIG. 11 is a vertical cross section of a conventional welding apparatus.
Figure 12:
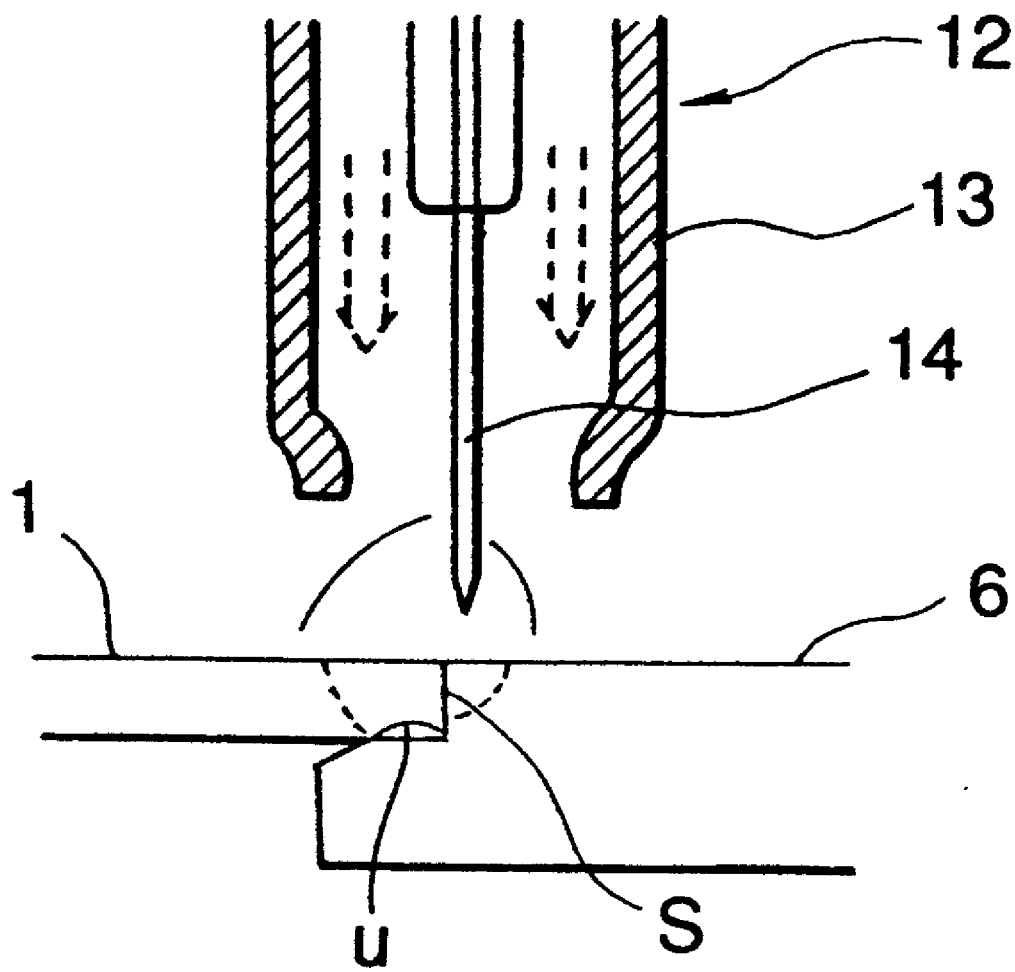
FIG. 12 is a detailed vertical cross section of a welding apparatus of the prior art.

In this situation, the welding apparatus 20 generates an arc discharge between the welding electrode 23 and the contact portion S, while discharging shield gas around the contact portion S from the gas nozzle 21 and rotating the cladding tube 1 and the plug 6 by the rotation holding means 7 (shown in FIG. 11), and thus the contact portion S is welded. The arc discharge can be generated by connecting the welding electrode 23 to a positive or negative electrode and the workpiece 5 or 6 to the opposite electrode, in which welding a direct or alternating current may be used.

During welding, the density of the shield gas discharged from the gas nozzle 21, forms a bell-shaped distribution so as to have its peak at the point directly under the center of the gas nozzle 21. The welding electrode 23 forms the boundary of two sides, and more shield gas is supplied to the side of the cladding tube 1 of the contact portion S than to another side thereof because the opening 21b of the gas nozzle 21 is disposed off to one side. Due to this distribution of the shield gas, the arc discharge and the contact portion S in the side of the cladding tube 1 with the low heat capacity is more cooled than those in the side of the plug 6 with the high heat capacity. The arc discharge in the side of the cladding tube 1 becomes smaller while the arc discharge in the side of the plug 6 spreads out, directing the arc discharge toward the side of the plug 6.

According to this process, the contact portion S in the both sides of the cladding tube 1 and of the plug 6 melts sufficiently, preventing the difference in temperature between them. The melting reaction is therefore carried out uniformly to produce an uniformly melted pool. Further, a welding bead is formed at the contact portion S, so that the welded portion has sufficient strength and an even surface.

As previously described, according to the embodiment, the opening 21b of the welding apparatus 20 is disposed off-center from the welding electrode 23. The arc discharge is thereby directed to the side of the plug 6 (or 5) with the high heat capacity so as to decrease the melting amount of the cladding tube 1, forming the welding bead at the contact portion S, and the resulting portion has sufficient strength and an even surface. Thus, an undercut is prevented, and the welding quality and the yield rate can be improved. Further, this enhances the reliability, decreases the amount of shield gas required, facilitates easy production and reduces costs.

Figure 5:
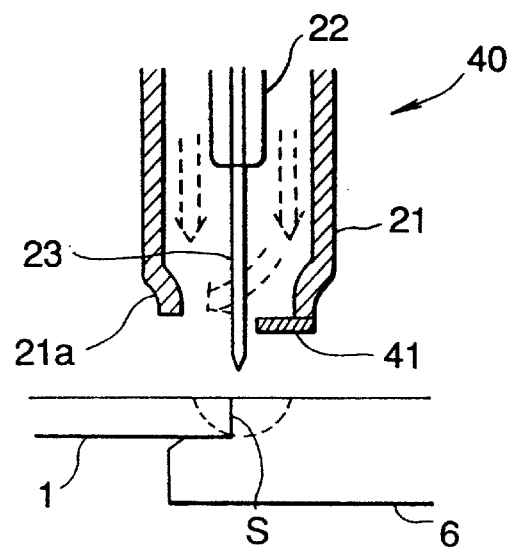
FIG. 5 is a detailed vertical cross section showing modification of the welding apparatus of the first embodiment.
Figure 6:
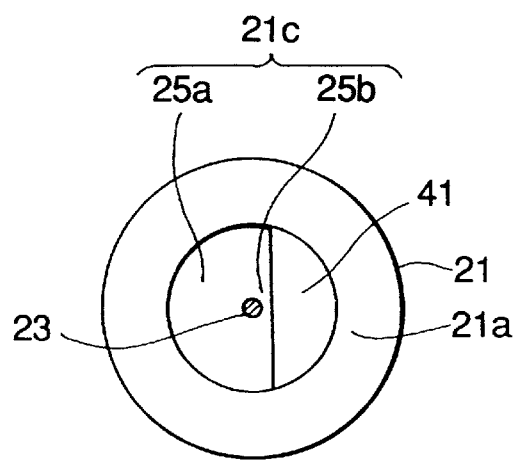
FIG. 6 is a bottom view of the tip of the welding apparatus of FIG. 5.

FIGS. 5 and 6 show modifications of the first embodiment, and reference numerals which are identical to those of the first embodiment, respectively, indicate elements which are identical to those of the first embodiment; therefore, explanation thereof will be omitted.

In the configuration of a welding apparatus 40 in FIGS. 5 and 6, the opening 21c is circular with its center concentric with the welding electrode 23. A baffle 41 having, for example, a semicircular shape, is attached to and half-closes the opening 21c. The baffle 41 is positioned apart from the linear welding electrode 23 concentric with the center of the gas nozzle 21. There is a gap 25a between the baffle 41 and the welding electrode 23, gap 25a being much narrower than gap 25b in another side thereof.

The configuration produces effects similar to those of the first embodiment. Furthermore, it can be easily manufactured, because only the process for attaching the baffle 41 is needed, eliminating deformation of the tip 21a of the welding apparatus 40.

In addition, the shape of the baffle 41 may be modified into various shapes: for example, the inner surface in the gas nozzle 31 or in the baffle 41 tapers toward the tip 21a, thereby allowing the shield gas to flow more smoothly from the opening 21c.

Figure 7:
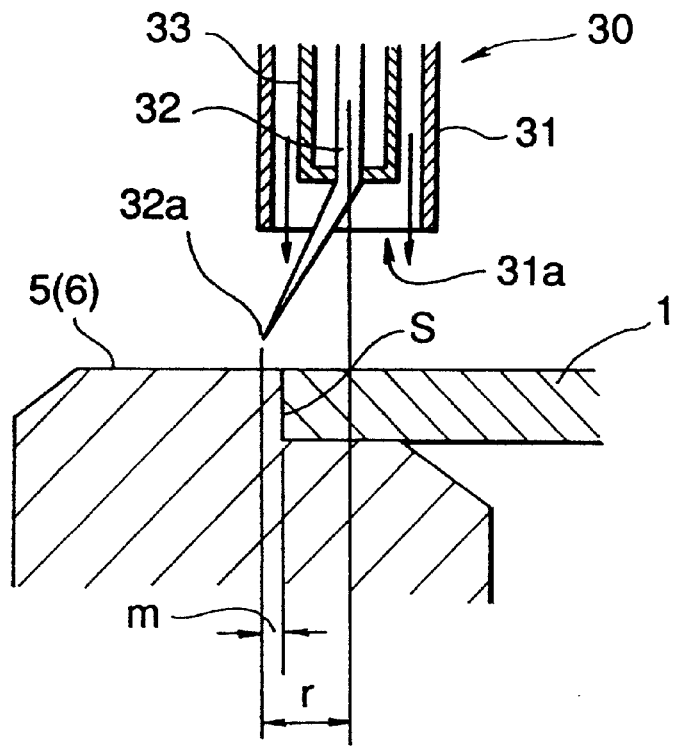
FIG. 7 is a detailed cross section of a welding apparatus in a process of a second embodiment according to the present invention.

Referring to FIGS. 6 and 7, the second embodiment of the present invention will be explained. FIG. 7 shows the detailed gas nozzle in detail.

In the configuration of a welding apparatus 30 in FIG. 7, a welding electrode 32 is held by a collet body 33 at the center of a cylindrical gas nozzle 31, so that the welding electrode 32 is disposed coaxially with the gas nozzle 31. It should be noted in this embodiment that the tip 32a of the welding electrode 32 is bent aslant and is directed toward the plug 5 (or 6) with the high heat capacity during the welding process.

Figure 8:
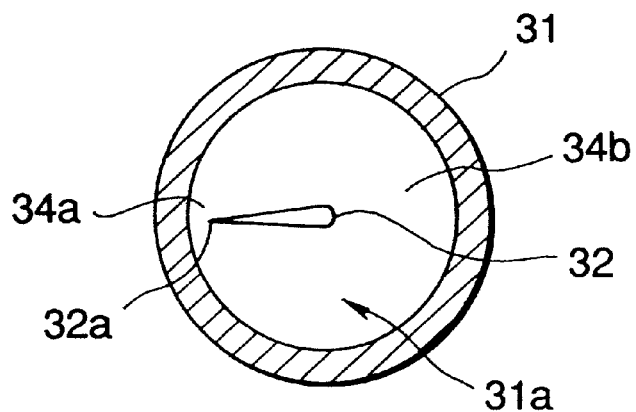
FIG. 8 is a bottom view of the tip of the welding apparatus of the second embodiment.

According to FIG. 8, the tip 32a of the welding electrode 32 forms the boundary of two sides, side 34a and side 34b, and the tip 32a is bent toward the side 34a. The distribution amount (amount of flow) of the shield gas discharged from the opening 31a of the gas nozzle 31, is therefore greater on the side 34b than the opposing side 34a.

In FIG. 7, the horizontal distance m between the tip 32a of the welding electrode 32 and the contact portion S can be adjusted, so as to balance temperature of the cladding tube 1 and of the plug 5 at the contact portion S during the welding process. The distance m is determined in consideration of the thickness of the cladding tube 1, the shape of the plug 5, the preheating condition, etc. The bending amount r of the tip 32a of the welding electrode 32 is limited in consideration of the amount of the shield gas, so as to prevent oxidation at the welded point on the side of the plug 5.

Next, a method for tungsten inert gas (TIG) welding with the welding apparatus 30 described above will be explained. The welding apparatus 30 is placed in proximity to the contact portion S of the cladding tube 1 and the plug 5 so that the bent tip 32a of the welding electrode 32 is disposed toward the side of the plug 5 from the contact portion S horizontally at the distance m. The arc discharge are therefore directed to the side of the plug 5.

In this situation, the contact portion S is welded while the gas nozzle 31 is discharging shield gas and the cladding tube 1 and the plug 5 are being rotated by the rotation holding means 7.

According to the method, the center of the arc discharge is positioned between the tip 32a of the welding electrode 32 and the point on the plug 5 directly under the welding electrode 32. Namely, the arc discharge is directed so that the input heat for welding is greater on the side of the plug 5 than the side of the cladding tube 1. In FIG. 7, the resulting heat is conducted toward the tip of the plug 5 (to the left in FIG. 7) and toward the center of the plug 5 (to the bottom), whereas it is conducted only to the other end of the cladding tube 1 (to the right). This balances the temperature at the contact portion S, preventing the difference in temperature between the cladding tube 1 and the plug 5, and the melting reaction is therefore carried out uniformly. A welding bead is formed at the contact portion S, so that the welded portion has sufficient strength and an even surface.

The density of the shield gas discharged from the gas nozzle 31, forms a bell-shaped distribution so as to have its peak at the point directly under the center of the gas nozzle 31. The density of the gas is less on the side of the plug 5, thereby reducing cooling effects thereof, whereas the density of the gas is greater on the side of the cladding tube 1, thereby effectively cooling the melted metal and inhibiting its fluidity so as to form a welding bead having a preferable shape.

Figure 9:
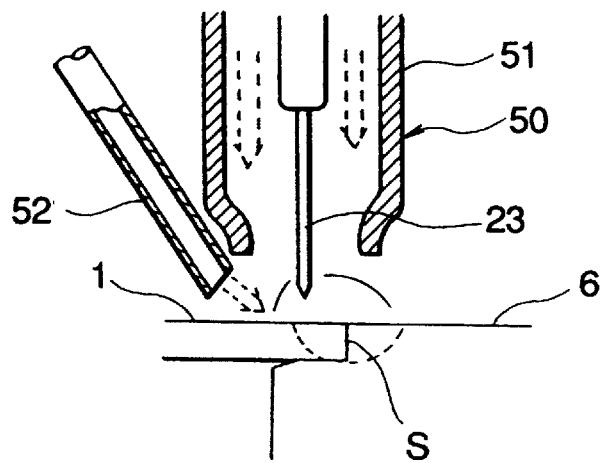
FIG. 9 is a detailed cross section of a welding apparatus in a process of a third embodiment according to the present invention.
Figure 10:
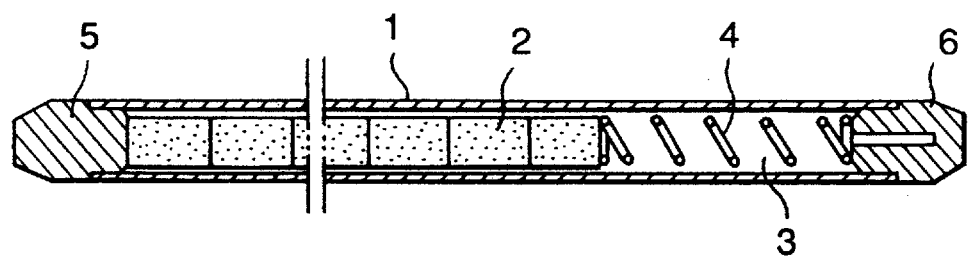
FIG. 10 is a schematic cross section of a conventional fuel rod.

In FIG. 9 showing a third embodiment, a welding apparatus 50 has a cylindrical gas nozzle 51 with an opening, at the center of which a welding electrode 23 is disposed. A side nozzle (second nozzle) 52 is positioned adjacent to the side of the gas nozzle 51.

During welding, the side nozzle 51 discharges shield gas toward the cladding tube 1 with the lower heat capacity at the contact portion S and toward an arc discharge thereto, equalizing the melting quantities of the workpieces.

It should be noted that the opening 21b of the gas nozzle 31 may be disposed off-center toward the welding electrode 23 in advance in order to direct the discharge of the shield gas, eliminating the deformation of the opening 21b, the mount of the baffle 41, and the bending of the welding electrode 23. Alternatively, the welding electrode 23 may be disposed off-center toward the opening 31b of the gas nozzle 31 in advance in order to direct the discharge of the shield gas. This invention can be adapted to welding processes for three or more workpieces and for workpieces other than the fuel rod.

This invention may be embodied in other forms or carried out in other ways without departing from the spirit thereof. The present embodiment is therefore to be considered in all respects illustrative and not restrictive, the scope of the invention being indicated by the appended claims, and all modifications falling within the meaning and range of equivalency are intended to be embraced therein.

What is claimed is:

1. A method for tungsten inert gas welding, comprising the steps of:

positioning the tip of a welding electrode on a line extending directly above a portion to be welded of a first and a second workpiece, said first workpiece having a higher heat capacity than the heat capacity of said second workpiece; generating an arc discharge between said welding electrode and the portion to be welded; and discharging more shield gas to said second workpiece than to said first workpiece at the portion to be welded from a shield gas nozzle having an asymmetrical nozzle opening.

2. The method for welding according to claim 1, further comprising the step of rotating said workpieces during welding.

3. A tungsten inert gas welding apparatus, in which a shield gas is discharged around a welding electrode of a welder and discharged to a first and a second workpiece and an arc is generated between said welding electrode and said first and said second workpiece to be welded to perform welding, said first workpiece having a higher heat capacity than the heat capacity of said second workpiece, wherein a shield gas nozzle has an asymmetrical nozzle opening for discharging more shield gas to said second workpiece than to said first workpiece at a portion to be welded, when the tip of said welding electrode is positioned on a line extending directly above the portion to be welded of said first and said second workpiece.

4. The welding apparatus according to claim 3, wherein the circumference of said opening is partially bent toward said welding electrode so as to dispose said opening of said gas nozzle off-center with respect to the tip of said welding electrode.

5. The welding apparatus according to claim 3, wherein a baffle is disposed at said opening so as to dispose said opening of said gas nozzle off-center with respect to the tip of said welding electrode.

6. The welding apparatus according to claim 3, wherein said welding electrode is bent so as to dispose said opening of said gas nozzle off-center with respect to the tip of said welding electrode.

7. The welding apparatus according to claim 3, further comprising means for rotating said workpieces while welding.

\* \* \* \* \*